2,755,140

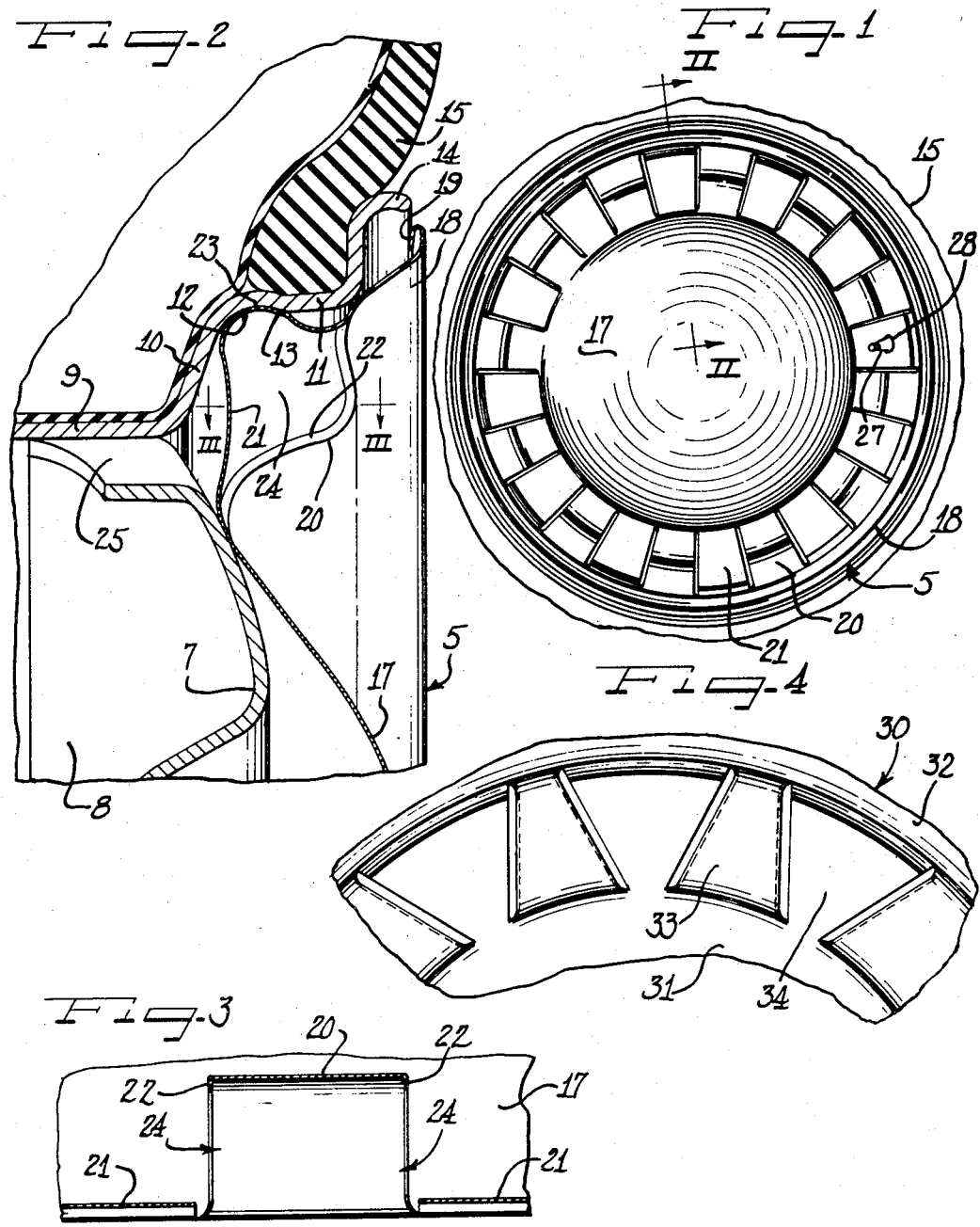
July 17, 1956 G. A. LYON 2,755,140
WHEEL COVER
Filed Feb. 18, 1954
Inventor
George Albert Lyon United States Patent Office 2,755,140
Patented July 17, 1956

WHEEL COVER

George Albert Lyon, Detroit, Mich.

Application February 18, 1954, Serial No. 411,148

5 Claims. (Cl. 301—37)

The present invention relates to improvements in wheel structures and more particularly concerns the ornamental and protective covering of the outer sides of vehicle wheels such as automobile wheels.

An important object of the present invention is to provide an improved wheel structure with a snap-on pry-off cover at the outer side thereof.

Another object of the invention is to provide an improved wheel structure having a groove in the tire rim within which retaining elements on a cover are adapted to engage in snap-on pry-off relation.

A further object of the invention is to provide a wheel structure with a cover therefor in which resilient spoke-like portions alternate with rigid spoke-like portions for snap-on pry-off interengagement with a shoulder on the wheel.

Still another object of the invention is to provide an improved wheel cover having novel means for self-retaining interengagement with a shouldered wheel.

Other objects, features and advantages of the present invention will be readily apparent from the following detailed description of certain preferred embodiments thereof taken in conjunction with the accompanying drawing in which:

Figure 1 is a side elevational view of a wheel structure embodying features of the invention;

Figure 2 is an enlarged fragmentary radial sectional view taken substantially on the line II—II of Figure 1;

Figure 3 is a fragmentary sectional detail view taken substantially on the line III—III of Figure 2; and Figure 4 is a fragmentary outer side elevational view of a modified form of the cover.

A wheel cover 5 as shown in Figures 1, 2 and 3 comprises a stamped or drawn sheet metal disk such as stainless steel or brass or the like having a fair degree of inherent resiliency. The cover is adapted to be applied in substantially entire covering relation to the outer side of a vehicle wheel comprising a wheel body 7 having a generally axially inwardly directed outer marginal attachment flange 8 which is secured in suitable fashion to a base flange 9 of a tire rim. The tire rim is of the drop center multi-flange type having a side flange 10 directed generally radially outwardly and slightly axially outwardly from the outer side of the base flange 9 and merging with an intermediate flange 11 directed generally axially outwardly and sloping radially outwardly and having at juncture with the side flange a generally radially inwardly directed groove 12 defined at its axially outer side by generally axially and radially inwardly facing shoulder 13. The intermediate flange merges with a generally radially outwardly and axially outwardly turned terminal flange 14. The tire rim is adapted to support a pneumatic tire and tube assembly 15.

The cover 5 is of a diameter to substantially entirely cover the outside of the wheel including the wheel body 7 and the tire rim and comprises a central crown portion 17 which at its radially outer side is adapted to bear against the radially outer portion of the wheel body 7. At its radially outer margin the cover 5 has an annular continuous rib-like marginal portion 18 provided with an underturned reinforcing and finishing bead 19 which in assembly is adapted to lie in adjacent spaced relation to the tip of the terminal flange 14 and accommodates wheel balancing weights therebehind.

Joining the radially inner side of the crown portion 17 and the radially outer annular marginal portion 18 of the cover are respective alternating series of outwardly humped spoke-like portions 20 and inwardly and radially outwardly directed offset spoke-like portions 21 severed from one another along their radial edges but joined contiguously and in one piece with respectively the crown portion 17 and the annular outer marginal portion 18 of the cover plate.

The outwardly humped spoke-like portions 20 are substantially unyielding and rigid by virtue of integral generally axially inwardly directed side flanges 22 thereon which merge into the crown portion 17 and the radially outer annular portion 18 of the cover at the ends of the spoke-like portions 20 and thus provide rigidifying and finishing side margins on the spoke-like portions 20.

On the other hand, the inwardly offset spoke-like portions 21 are of resilient structure in a radial sense and are adapted for retaining snap-on pry-off interengagement within the groove 12 of the tire rim to retain the cover on the wheel. To this end, the spoke-like portions 21 extend radially outwardly behind the cover margin 18 to provide radially outwardly directed resilient shoulders 23 which normally extend to a slightly greater diameter than the inside diameter defined by the annular groove 12. Thereby, for applying the cover to the wheel, it is generally centered with respect to the wheel and the shoulder portions 23 engage cammingly against the inner side of the intermediate flange 11 and flex resiliently radially inwardly until they snap behind the shoulder 13 into the groove 12.

In the radially inward flexing of the spoke shoulders 23, relatively long generally radially extending leg portions thereof connecting the same to the crown 17 may yield resiliently in a radial direction, while shorter generally axially outwardly directed leg portions connecting the shoulders 23 to the annular outer cover portion 18 may yield in a radial direction. The cumulative tension applied by the long radial and shorter axial legs of the spokes 21 effects strong resilient tension directed radially outwardly in the shoulder portion 23 into the groove 12. Between the outer spokes 20 and the inner spokes 21 substantial circumferentially directed openings 24 are provided for air circulation through the cover and through respective wheel openings 25 provided in the wheel body as by inset portions of the attachment flange 8 of the wheel body.

In order to accommodate a valve stem 27, one of the inset spoke portions 21 is provided with a valve stem aperture.

In the modification shown in Figure 4, a wheel cover 30 having a central crown portion 31 and a radially outer annular portion 32 is provided with alternating outwardly humped spoke-like portions 33 and inwardly directed spoke-like portions 34. In this form, the outer spoke-like portions 33 are substantially wider at their radially inner ends than at their outer ends while the spoke-like portions 34 are correspondingly substantially wider at their radially outer portions than they are at their radially inner ends. This affords substantially greater contact area for the radially outwardly directed portions of the spokes 34 corresponding substantially to the shoulders 23 of the cover in Figure 2 for engaging with a retaining shoulder on a wheel.

It will be understood that modifications and variations may be effected without departing from the scope of the novel concepts of the present invention.

I claim as my invention:

1. In a wheel structure including a part having an annular shoulder facing generally axially inwardly, a cover for disposition at the outer side of the wheel comprising a cover plate having alternating axially offset spoke-like portions, the axially innermost of the spoke-like portions being resiliently flexible and having retaining shoulders thereon cooperable in snap-on pry-off relation with said wheel shoulder and the axially outer of said spoke-like portions having longitudinal reinforcement rendering the same substantially rigid.

2. In a wheel structure including a part having an annular shoulder facing generally axially inwardly, a cover for disposition at the outer side of the wheel comprising a cover plate having alternating axially offset spoke-like portions, the axially innermost of the spoke-like portions being resiliently flexible and having retaining shoulders thereon cooperable in snap-on pry-off relation with said wheel shoulder and the axially outer of said spoke-like portions having longitudinal reinforcement rendering the same substantially rigid, said longitudinal reinforcement comprising inturned side flanges on the outer of the spoke-like portions.

3. In a wheel structure including a wheel body and a tire rim supported thereby and having a flange thereon providing a generally radially inwardly opening groove defined at its axially outer side by a generally radially and axially inwardly facing shoulder, a cover for disposition at the outer side of the wheel comprising a plate having a series of alternating axially inwardly and outwardly directed spoke-like strip portions in an annular area thereof overlying the juncture of the wheel and tire rim, the outer of said spoke-like strips having reinforcing flanges thereon to render the same substantially rigid and the inner of said spoke-like strips having generally radially outwardly directed resilient shoulders engageable in snap-on pry-off relation behind said tire rim shoulder in said groove.

4. In a wheel structure including a wheel body and a tire rim supported thereby and having a flange thereon providing a generally radially inwardly opening groove defined at its axially outer side by a generally radially and axially inwardly facing shoulder, a cover for disposition at the outer side of the wheel comprising a plate having a series of alternating axially inwardly and outwardly directed spoke-like strip portions in an annular area thereof overlying the juncture of the wheel and tire rim, the outer of said spoke-like strips having reinforcing flanges thereon to render the same substantially rigid, and the inner of said spoke-like strips having generally radially outwardly directed resilient shoulders engageable in snap-on pry-off relation behind said tire rim shoulder in said groove, said inner strip spoke-like portions having long legs providing resilient radially outward thrust toward said shoulders thereon.

5. In a cover for disposition at the outer side of a vehicle wheel, a cover plate having an annular outer portion and a crown portion and a series of alternating axially outward and axially inwardly directed spoke-like integral portions connecting said annular and crown portions of the cover, the outer of said spoke-like portions having finishing and reinforcing side flanges rendering the same substantially rigid, and the inner of said spoke-like portions being substantially resilient and having cover retaining shoulders thereon engageable in resilient snap-on pry-off relation with a shoulder on a wheel.

References Cited in the file of this patent

UNITED STATES PATENTS

| | | |
|---|---|---|
| 1,386,405 | Hills | Aug. 2, 1921 |
| 2,094,326 | Lyon | Sept. 28, 1937 |